(12) United States Patent
Liu et al.

(10) Patent No.: US 12,108,136 B2
(45) Date of Patent: Oct. 1, 2024

(54) IN-VEHICLE DISPLAY DEVICE

(71) Applicant: WUHAN CHINA STAR OPTOELECTRONICS TECHNOLOGY CO., LTD., Hubei (CN)

(72) Inventors: Hongzhu Liu, Hubei (CN); Song Li, Hubei (CN); Fancheng Liu, Hubei (CN); Teng Wu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,766

(22) PCT Filed: Nov. 30, 2021

(86) PCT No.: PCT/CN2021/134621
§ 371 (c)(1),
(2) Date: Dec. 24, 2021

(87) PCT Pub. No.: WO2023/082372
PCT Pub. Date: May 19, 2023

(65) Prior Publication Data
US 2024/0056670 A1   Feb. 15, 2024

(30) Foreign Application Priority Data
Nov. 15, 2021 (CN) .......................... 202111348629.1

(51) Int. Cl.
*H04N 23/00* (2023.01)
*H04N 7/18* (2006.01)
(Continued)

(52) U.S. Cl.
CPC ............. *H04N 23/57* (2023.01); *H04N 7/181* (2013.01); *H04N 23/20* (2023.01)

(58) Field of Classification Search
CPC ......... H04N 23/57; H04N 7/181; H04N 23/20
See application file for complete search history.

(56) References Cited

U.S. PATENT DOCUMENTS 10,347,179 B2 * 7/2019 Kim .................... G09G 3/3266
11,067,853 B1    7/2021 Mei et al.
(Continued)

FOREIGN PATENT DOCUMENTS

CN    108885376 A    11/2018
CN    109283736 A    1/2019
(Continued)

OTHER PUBLICATIONS

International Search Report in International application No. PCT/CN2021/134621, mailed on Jul. 29, 2022.
(Continued)

*Primary Examiner* — Frank F Huang
(74) *Attorney, Agent, or Firm* — PV IP PC; Wei Te Chung (57) ABSTRACT

An in-vehicle display device is provided. The in-vehicle display device includes a display panel including a non-display light transmissive area and a display area located on a periphery of the non-display light transmissive area, and an infrared sensing component located on a back side of a light emergence surface of the display panel, disposed corresponding to the non-display light transmissive area, and configured to receive infrared, wherein an infrared transmittance of the non-display light transmissive area of the display panel is greater than an infrared transmittance of the display area of the display panel.

20 Claims, 4 Drawing Sheets

(51) Int. Cl.
*H04N 23/20* (2023.01)
*H04N 23/57* (2023.01)

(56) References Cited

U.S. PATENT DOCUMENTS

| | | | | |
|---|---|---|---|---|
| 11,340,491 | B2* | 5/2022 | Hasegawa | F21V 23/00 |
| 2010/0046059 | A1* | 2/2010 | McCabe | G02B 5/0858 |
| | | | | 359/263 |
| 2013/0106787 | A1* | 5/2013 | Lee | G06F 3/042 |
| | | | | 345/175 |
| 2015/0181099 | A1* | 6/2015 | Van Der Tempel | G01S 7/4911 |
| | | | | 348/135 |
| 2017/0094271 | A1* | 3/2017 | Liu | H04N 19/176 |
| 2017/0220844 | A1* | 8/2017 | Jones | G06F 1/1637 |
| 2018/0048909 | A1* | 2/2018 | Liu | H04N 19/105 |
| 2018/0081093 | A1* | 3/2018 | Wang | G02B 5/0231 |
| 2018/0103260 | A1* | 4/2018 | Chuang | H04N 19/70 |
| 2018/0124394 | A1* | 5/2018 | Xu | H04N 19/573 |
| 2018/0152727 | A1* | 5/2018 | Chuang | H04N 19/70 |
| 2019/0158713 | A1 | 5/2019 | McMillan et al. | |
| 2020/0117034 | A1* | 4/2020 | Yin | H04M 1/02 |
| 2020/0185643 | A1 | 6/2020 | Moon et al. | |
| 2021/0263375 | A1 | 8/2021 | Hasegawa | |

FOREIGN PATENT DOCUMENTS

| | | |
|---|---|---|
| CN | 110459563 A | 11/2019 |
| CN | 110703510 A | 1/2020 |
| CN | 210573827 U | 5/2020 |
| JP | 2018038553 A | 3/2018 |
| JP | 2020518010 A | 6/2020 |
| JP | 2021118487 A | 8/2021 |
| KR | 20180136386 A | 12/2018 |
| KR | 20200002968 A | 1/2020 |
| KR | 20200051038 A | 5/2020 |
| WO | 2018216545 A1 | 11/2018 |

OTHER PUBLICATIONS

Written Opinion of the International Search Authority in International application No. PCT/CN2021/134621, mailed on Jul. 29, 2022.
Japanese Office Action issued in corresponding Japanese Patent Application No. 特願2021-572945 dated Dec. 26, 2023, pp. 1-5.
Korean Office Action issued in corresponding Korean Patent Application No. 10-2022-7018199 dated Oct. 23, 2023, pp. 1-9.
Eurasian Office Action issued in corresponding Eurasian Patent Application No. 202292344 dated Jun. 25, 2024, pp. 1-2.

* cited by examiner

IN-VEHICLE DISPLAY DEVICE

FIELD OF INVENTION

The present application relates to the field of display technology, and especially to an in-vehicle display device.

BACKGROUND OF INVENTION

Currently, for a need that an in-vehicle driver monitor system (DMS) requires a camera to monitor continuous driving and a state of a driver, camera under panel technology is applied to in-vehicle DMS. However, although conventional in-vehicle camera under panel has a good image-capturing effect during the day, when in a darker environment, imaging quality is worse due to environmental limitation, so conventional in-vehicle camera under panel cannot fulfill the need for in-vehicle DMS.

Therefore, it is necessary to provide a technical approach to solve a problem that conventional in-vehicle camera under panel has worse imaging quality in a darker environment.

SUMMARY OF INVENTION

The present application is to provide an in-vehicle display device to improve imaging quality of conventional in-vehicle display devices in a darker environment.

An in-vehicle display device including:

A display panel including a non-display light transmissive area and a display area located on a periphery of the non-display light transmissive area; and an infrared sensing component located on a back side of a light emergence surface of the display panel, disposed corresponding to the non-display light transmissive area, and configured to receive infrared; wherein an infrared transmittance of the non-display light transmissive area of the display panel is greater than an infrared transmittance of the display area of the display panel.

The present application provides an in-vehicle display device. Through disposing an infrared sensing component corresponding to a non-display light transmissive area of a display panel, and an infrared transmittance of the non-display light transmissive area of the display panel being greater than an infrared transmittance of the display area of the display panel, when a vehicle is under a darker environment, the infrared sensing component can receive infrared to realize imaging, improving imaging quality of the in-vehicle display device under the darker environment.

DETAILED DESCRIPTION OF PREFERRED EMBODIMENTS

Although the present application has been explained in relation to its preferred embodiment, it does not intend to limit the present application. It will be apparent to those skilled in the art having regard to this present application that other modifications of the exemplary embodiments beyond these embodiments specifically described here may be made without departing from the spirit of the application. Accordingly, such modifications are considered within the scope of the application as limited solely by the appended claims.

Figure 1:
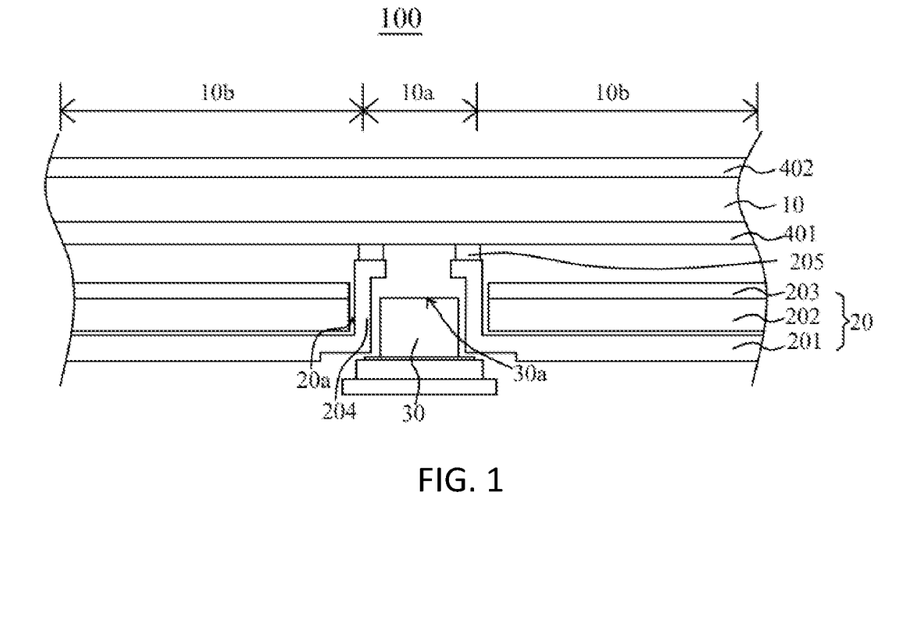
FIG. 1 is a sectional view of an in-vehicle display device according to an embodiment of the present application.

As shown in FIG. 1, the present application provides an in-vehicle display device 100. The in-vehicle display device 100 is installed in a vehicle and applied to a driver monitor system (DMS). The in-vehicle display device 100 has a display function and an image-capturing function, and can satisfy a need of the DMS monitoring continuous driving and a state of a driver.

Wherein, the in-vehicle display device 100 includes a display panel 10, a backlight module 20, an infrared sensing component 30, a first polarizing plate 401, and a second polarizing plate 402. The display panel 10 includes a non-display light transmissive area 10a and a display area 10b, and the display area 10b is located on a periphery of the non-display light transmissive area 10a. The backlight module 20 is located on a back side of a light emergence surface of the display panel 10, a second through hole 20a is defined in the backlight module 20 corresponding to the non-display light transmissive area 10a, and the second through hole 20a penetrates the backlight module 20. The infrared sensing component 30 is disposed in the second through hole 20a, that is, the infrared sensing component 30 is located on the back side of the light emergence surface of the display panel 10 and disposed corresponding to the non-display light transmissive area 10a. The first polarizing plate 401 is disposed between the backlight module 20 and the display panel 10, the second polarizing plate 402 is disposed on one side of the display panel 10 away from the first polarizing plate 401, and the first polarizing plate 401 and the second polarizing plate 402 are laminated on opposite sides of the display panel 10.

In the present embodiment, the infrared sensing component 30 is configured to receive infrared reflected by a target imaged object after emitting infrared to realize image capturing and monitor. The infrared sensing component 30 has a light emergence surface 30a, and the light emergence surface 30a is also its light incidence surface. The infrared sensing component 30 includes an infrared transmitter and an infrared receiver, the infrared transmitter is configured to emit infrared, and the infrared receiver is configured to receive infrared emitted to and reflected by a target imaged object.

Wherein, a wavelength of infrared in the present application ranges from 850 nanometers to 1000 nanometers, such that infrared emitted by the infrared sensing component 30 has a satisfactory transmittance to go through the display panel 10 and reach a target imaged object such as a driver, while a satisfactory reflectivity of the infrared on the target imaged object such as the driver is also ensured. The infrared is received by the infrared sensing component 30 after reflecting, facilitating increasing imaging quality of the infrared sensing component 30. For example, a preset wavelength can be 860 nanometers, 900 nanometers, 920 nanometers, 940 nanometers, 960 nanometers, or 1000 nanometers.

It should be explained that, for a need of taking pictures in a darker environment, image-capturing is performed using infrared in the present application. However, the longer a wavelength of infrared is, the higher transmittance of the infrared is, and the lower reflectivity is. Low transmittance leads to a short distance of transmission, and low reflectivity leads to a great loss of the infrared and is disadvantageous to receiving the infrared. Based on factors in in-vehicle application circumstances such as a distance between the infrared sensing component 30 of the in-vehicle display device 100 and a target imaged object such as a driver, the present embodiment specifically chooses infrared to balance transmittance and reflectivity and ensure imaging requirements in the in-vehicle application circumstances.

In the present embodiment, the display panel 10 is a liquid crystal display panel. A plurality of pixels are disposed at the display area 10b of the display panel 10 to realize display of the display area 10b. Each pixel includes a red sub-pixel, a green sub-pixel, and a blue sub-pixel, and any one of the red sub-pixel, the green sub-pixel, and the blue sub-pixel includes a pixel electrode, a common electrode, liquid crystals, and a corresponding resistor. A shape of each pixel is square, and a shape of each sub-pixel is rectangular. A length and a width of the pixels range from 200 micrometers to 400 micrometers. The non-display light transmissive area 10a of the display panel 10 is not for display and is configured for infrared to transmit. A shape of the non-display light transmissive area 10a is round, and the shape of the non-display light transmissive area 10a can also be other shapes.

Wherein, an infrared transmittance of the non-display light transmissive area 10a of the display panel 10 is greater than an infrared transmittance of the display area 10b of the display panel 10, increasing transmittance of infrared transmitting through the non-display light transmissive area 10a of the display panel 10, and with satisfactory transmittance of the infrared in darker environments, further improving imaging quality of the in-vehicle display device 100 in darker environments.

In the present embodiment, the infrared transmittance of the non-display light transmissive area 10a of the display panel 10 is greater than or equal to 50% to ensure enough infrared transmitting through the display panel 10, facilitating improving imaging quality. The greater the infrared transmittance of the non-display light transmissive area 10a of the display panel 10 is, the better imaging quality of the infrared sensing component 30 is. For example, the infrared transmittance of the non-display light transmissive area 10a of the display panel 10 is 55%, 60%, 65%, 70%, 80%, 85%, 90%, or 95%.

Specifically, the infrared transmittance of the non-display light transmissive area 10a of the display panel 10 is greater than or equal to 70% to ensure clear imaging by the infrared sensing component 30.

Figure 2:
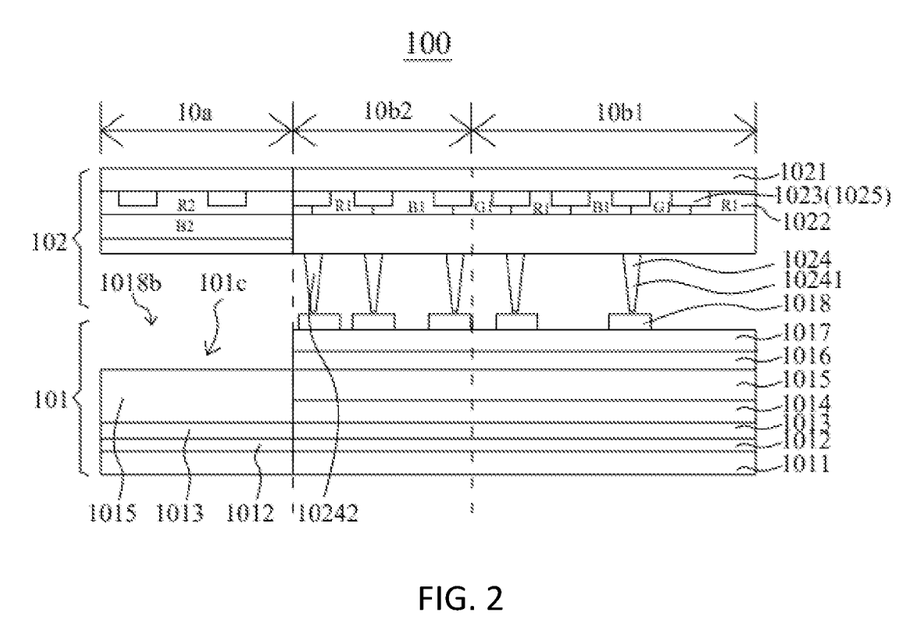
FIG. 2 is a sectional view of a display panel of the in-vehicle display device shown in FIG. 1.

In the present embodiment, as shown in FIG. 2, the display area 10b includes a main display area 10b1 and a transition display area 10b2, and the transition display area 10b2 is located between the main display area 10b1 and the non-display light transmissive area 10a. When the in-vehicle display device 100 displays, the transition display area 10b2 is configured to realize a smooth transition of brightness between the main display area 10b1 and the non-display light transmissive area 10a, preventing a bright edge from occurring between the main display area 10b1 and the non-display light transmissive area 10a, and further preventing the non-display light transmissive area 10a from being easily observed. When the in-vehicle display device 100 is in a screen-off state, the transition display area 10b2 is configured to match reflectivity of the main display area 10b1 and the non-display light transmissive area 10a, preventing the non-display light transmissive area from being easily observed. Wherein, an area of the main display area 10b1 is greater than an area of the transition display area 10b2. A shape of the transition display area 10b2 is an annulus. It can be understood that the shape of the transition display area 10b2 can also be other shapes.

In the present embodiment, the infrared transmittance of the non-display light transmissive area 10a of the display panel 10 is greater than an infrared transmittance of the main display area 10b1 of the display panel 10, an infrared transmittance of at least a part of the transition display area 10b2 of the display panel 10 is less than the infrared transmittance of the main display area 10b1 of the display panel 10, and the infrared transmittance of the at least a part of the transition display area 10b2 of the display panel 10 decreases in a direction from the main display area 10b1 to the transition display area 10b2, such that when the in-vehicle display device displays, brightness of backlight after transmitting through the transition display area 10b2 decreases in a direction from the main display area 10b1 to the non-display light transmissive area 10a. Display brightness is higher at the main display area 10b1, decreases through the transition display area 10b2, and is lower at the non-display light transmissive area 10a, such that a smooth transition of brightness is realized between the main display area 10b1 and the non-display light transmissive area 10a, preventing the non-display light transmissive area 10a of the in-vehicle display device from being easily observed when displaying.

Specifically, the infrared transmittance of the main display area 10b1 of the display panel 10 is less than 50%, such that the main display area 10b1 of the display panel 10 has enough space for laying out opaque structures such as transistors and metal wiring, ensuring high resolution of the display panel. For example, the infrared transmittance of the main display area 10b1 of the display panel 10 is 10%, 15%, 20%, 25%, 30%, 35%, 40%, 45%, etc. An infrared transmittance of the transition display area 10b2 of the display panel 10 is less than 50%. For example, the infrared transmittance of the transition display area 10b2 of the display panel 10 is 10%, 15%, 20%, 25%, 30%, 35%, 40%, 45%, etc.

It should be explained that, in the present application, transmittance means a ratio between brightness of light after transmitting through the display panel and initial brightness of the light before transmitting through the display panel.

In the present embodiment, a size of the transition display area 10b2 in the direction from the main display area 10b1 to the non-display light transmissive area 10a is greater than or equal to a size corresponding to five of the pixels, ensuring a large enough size of the transition display area 10b2 in the direction from the main display area 10b1 to the non-display light transmissive area 10a, and further ensuring enough pixels to realize a smooth transition of brightness. Meanwhile, the size of the transition display area 10b2 in the direction from the main display area 10b1 to the non-display light transmissive area 10a is less than or equal to a size corresponding to fifteen pixels, preventing the non-display light transmissive area 10*a* from being easily recognized by human eyes due to an excessively large size of the transition display area 10*b*2 in the direction from the main display area 10*b*1 to the non-display light transmissive area 10*a*. For example, the size of the transition display area 10*b*2 in the direction from the main display area 10*b*1 to the non-display light transmissive area 10*a* is equal to a size corresponding to six pixels, a size corresponding to seven pixels, a size corresponding to eight pixels, a size corresponding to ten pixels, a size corresponding to twelve pixels, or a size corresponding to fifteen pixels.

Specifically, when the shape of the non-display light transmissive area 10*a* is round, in the direction from the main display area 10*b*1 to the non-display light transmissive area 10*a* and along a radial direction of the non-display light transmissive area 10*a*, the size of the transition display area 10*b*2 is equal to the size corresponding to ten pixels. For example, a size of one pixel is 150 micrometers, and a size of ten pixels is 1.5 millimeters.

It should be explained that, in the present application, through a differentiation design of film layers of the non-display light transmissive area 10*a*, the transition display area 10*b*2, and the main display area 10*b*1 of the display panel, the infrared transmittance of the non-display light transmissive area 10*a* being greater than the infrared transmittance of the main display area 10*b*1, the infrared transmittance of the main display area 10*b*1 being greater than the infrared transmittance of the transition display area 10*b*2, and the infrared transmittance of the transition display area 10*b*2 decreasing in the direction from the main display area 10*b*1 to the non-display light transmissive area 10*a* are realized.

In the present embodiment, the display panel 10 includes an array substrate 101, a color filter substrate 102, and a liquid crystal layer. The array substrate 101 is disposed facing the color filter substrate 102, and the liquid crystal layer is disposed between the array substrate 101 and the color filter substrate 102.

Figure 3:
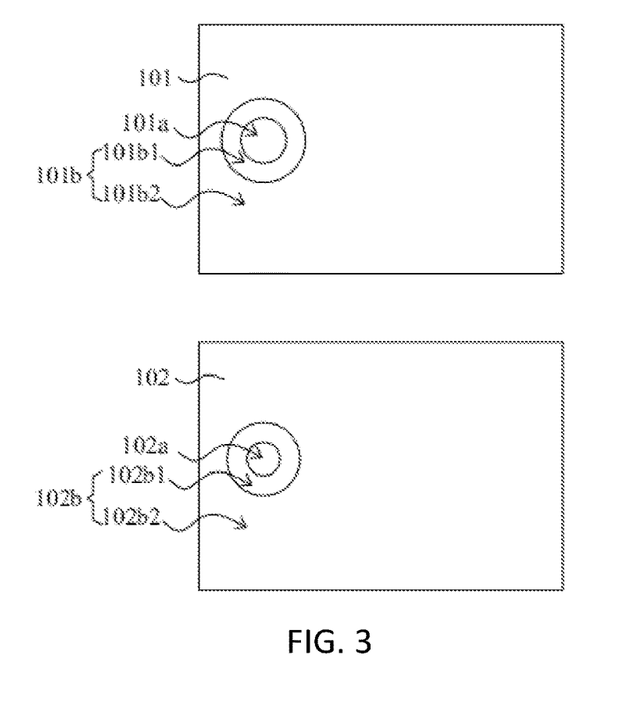
FIG. 3 is a top view of an array substrate and a color filter substrate of the display panel shown in FIG. 2.

Wherein, as shown in FIG. 3, the array substrate 101 includes a first area 101*a* corresponding to the non-display light transmissive area 10*a* and a third area 101*b* corresponding to the display area 10*b*, the third area 101*b* is located on a periphery of the first area 101*a*, and the third area 101*b* includes a first sub-area 101*b*1 corresponding to the transition display area 10*b*2 and a second sub-area 101*b*2 corresponding to the main display area 10*b*1. The color filter substrate 102 includes a second area 102*a* corresponding to the non-display light transmissive area 10*a* and a fourth area 102*b* corresponding to the display area 10*b*, the fourth area 102*b* includes a third sub-area 102*b*1 corresponding to the transition display area 10*b*2 and a fourth sub-area 102*b*2 corresponding to the main display area 10*b*1, and an overlapping area of the first area 101*a* and the second area 102*a* is the non-display light transmissive area 10*a*.

Wherein, an area of the first area 101*a* is different from an area of the second area 102*a* to ensure that the overlapping area of the first area 101*a* and the second area 102*a* is greater than or equal to a preset area of the non-display light transmissive area 10*a* after cell aligning of the array substrate 101 and the color filter substrate 102.

Specifically, when the color filter substrate 102 is located on a light emergence side of the display panel 10, the area of the second area 102*a* is less than the area of the first area 101*a*, such that a non-display area close to the light emergence side is smaller and the non-display area of the in-vehicle display device is more difficult to be recognized by human eyes. It can be understood that, when the array substrate 101 is located on the light emergence side of the display panel 10, the area of the first area 101*a* is less than the area of the second area 102*a*.

In the present embodiment, as shown in FIG. 2, the array substrate 101 includes a first substrate 1011, a buffer layer 1012, a gate metal layer (not shown), a gate insulation layer 1013, a source and drain metal layer (not shown), a layer insulation layer 1014, a planarization layer 1015, a common electrode layer 1016, a passivation layer 1017, a pixel electrode layer 1018 sequentially stacked, and a blind hole 101*c*. Wherein, the buffer layer 1012 is a silica layer, the gate insulation layer 1013 is the silica layer, the layer insulation layer 1014 includes the silica layer and a silicon nitride layer, the planarization layer 1015 is an organic layer, the common electrode layer 1016 is an indium tin oxide layer, the passivation layer 1017 is the silicon nitride layer, and a manufacturing material of the pixel electrode layer 1018 is indium tin oxide.

In the present embodiment, as shown in FIG. 2, the pixel electrode layer 1018 includes a plurality of pixel electrodes 1018*a* with a slit and a first through hole 1018*b*, the plurality of pixel electrodes 1018*a* with the slit are disposed at the third area 101*b* of the array substrate 101, and the first through hole 1018*b* is disposed at the first area 101*a* of the array substrate 101 and penetrates the pixel electrode layer 1018 to prevent infrared with a preset wavelength that is intended to be transmitted through the non-display light transmissive area 10*a* from diffraction by the pixel electrodes 1018*a* with the slit, preventing its transmission from being affected. Furthermore, transmittance of infrared through the pixel electrodes 1018*a* is lower, so removing the pixel electrodes 1018*a* at the non-display light transmissive area 10*a* is advantageous to increasing the infrared transmittance of the non-display light transmissive area 10*a* of the display panel.

In the present embodiment, the blind hole 101*c* is defined at the first area 101*a* and penetrates the layer insulation layer 1014, the common electrode layer 1016, and the passivation layer 1017 to increase an infrared transmittance of the first area 101*a* of the array substrate 101. It can be understood that the blind hole 101*c* can also penetrate one or two film layers of the layer insulation layer 1014, the common electrode layer 1016, and the passivation layer 1017 to increase the infrared transmittance of the first area 101*a* of the array substrate 101, further increasing the infrared transmittance of the non-display light transmissive area.

Because a metal film layer and a part of nonmetal film layer of the first area 101*a* of the array substrate 101 are removed, transmittance of the first area 101*a* of the array substrate 101 is higher, and the reflectivity is lower. Because the third area 101*b* of the array substrate 101 keeps a metal film layer and all nonmetal film layers, transmittance of the third area 101*b* of the array substrate 101 is lower, and the reflectivity is higher.

Following table 1 shows transmittance of infrared with a wavelength of 940±10 nm with respect to film layers of the array substrate.

TABLE 1

| film layers | transmittance |
|---|---|
| buffer layer | 100% |
| gate insulation layer | 90%-100% |
| layer insulation layer | 65%-75% |
| planarization layer | 100% |
| common electrode layer | 50%-60% |

TABLE 1-continued

| film layers | transmittance |
|---|---|
| passivation layer | 65%-75% |
| pixel electrode layer | 65%-75% |

It can be seen from table 1 that transmittance of infrared with a wavelength of 940±10 nm with respect to the layer insulation layer, the common electrode layer, the passivation layer, and the pixel electrode layer on the array substrate is lower. Removing these film layers of the first area 101a of the array substrate is advantageous to increasing the infrared transmittance of the non-display light transmissive area.

In the present embodiment, the color filter substrate 102 includes a second substrate 1021, a color filter layer 1022, a black matrix layer 1023, and a supporting pillar 1024. The color filter layer 1022, the black matrix layer 1023, and the supporting pillar 1024 are disposed on the second substrate 1021.

In the present embodiment, the black matrix layer 1023 includes a black matrix block 1025 and a plurality of openings located between the black matrix block 1025. On the one hand, the black matrix block 1025 has a property of absorbing light, on the other hand, it also has a property of reflecting light. Absorbance of the black matrix block 1025 is greater than its reflectivity, that is, a main property of the black matrix block 1025 is absorbing light. The openings facilitates transmission of light through the color filter substrate 102. Wherein, a manufacturing material of the black matrix block 1025 can be metal, and the manufacturing material of the black matrix block 1025 can also be organic resin or black pigment.

Figure 4:
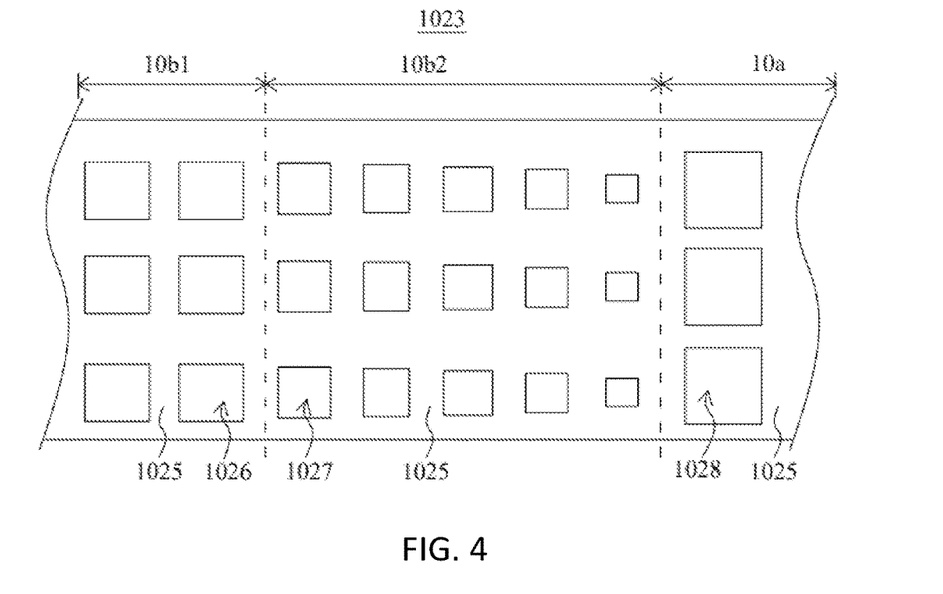
FIG. 4 is a top view of a black matrix layer of the color filter substrate shown in FIG. 3.

Wherein, as shown in FIG. 4, an area occupation ratio at the main display area 10b1 of the black matrix block 1025 disposed at the main display area 10b1 is greater than an area occupation ratio at the non-display light transmissive area 10a of the black matrix block 1025 disposed at the non-display light transmissive area 10a, further making the infrared transmittance of the main display area 10b1 be less than the infrared transmittance of the non-display light transmissive area 10a. An area occupation ratio at the transition display area 10b2 of the black matrix block 1025 disposed at the transition display area 10b2 is greater than the area occupation ratio at the main display area 10b1 of the black matrix block 1025 disposed at the main display area 10b1, and a unit area occupation ratio at the transition display area 10b2 of the black matrix block 1025 disposed at the transition display area 10b2 increases in a direction from the main display area 10b1 to the non-display light transmissive area 10a, such that, on the one hand, when the in-vehicle display device displays, backlight transmittance of the main display area 10b1 is greater than backlight transmittance of the transition display area 10b2, and brightness of the main display area 10b1 is greater than brightness of the transition display area 10b2. Meanwhile, the brightness of the transition display area 10b2 decreases in the direction from the main display area 10b1 to the non-display light transmissive area 10a. Because there is no backlight at the non-display light transmissive area 10a, the brightness of the transition display area 10b2 being greater than brightness of the non-display light transmissive area 10a is advantageous to a smooth brightness transition of the display device when displaying. On the other hand, when the in-vehicle display device is in a screen-off state, a distribution density of the black matrix block 1025 at the transition display area 10b2 increases in a direction from the main display area 10b1 to 10b1. Because of the property of absorbing light of the black matrix block 1025, flux of ambient light through the black matrix block 1025 at the transition display area 10b2 decreases in the direction from the main display area 10b1 to 10b1, and ambient light reflectivity of metal on a side of the array substrate decreases in the direction from the main display area 10b1 to 10b1. Because metal film layer reflectivity of the array substrate 101 at the main display area 10b1 is higher, and reflectivity at the non-display light transmissive area 10a is lower due to no metal film layers there, a design of the black matrix block 1025 at the transition display area 10b2 realizes matching from ambient light reflectivity of the main display area 10b1 to ambient light reflectivity of the non-display light transmissive area 10a.

Wherein, a ratio between the area occupation ratio at the main display area 10b1 of the black matrix block 1025 disposed at the main display area 10b1 and the area occupation ratio at the non-display light transmissive area 10a of the black matrix block 1025 disposed at the non-display light transmissive area 10a is greater than or equal to 1.5, such that transmittance of the main display area 10b1 is less than transmittance of the non-display light transmissive area 10a. For example, the ratio is 1.5, 2, 3, 8, 10, or 15.

In the present embodiment, the area occupation ratio of the black matrix block 1025 at the main display area 10b1 is greater than or equal to 30%, and the area occupation ratio of the black matrix block 1025 at the non-display light transmissive area 10a is greater than or equal to 0% and less than or equal to 20%. For example, the area occupation ratio of the black matrix block 1025 at the main display area 10b1 is 35%, 40%, 45%, 50%, 60%, or 70%. The area occupation ratio of the black matrix block 1025 at the non-display light transmissive area 10a is 0%, 2%, 5%, 8%, 10%, or 15%.

Specifically, the area occupation ratio of the black matrix block 1025 at the non-display light transmissive area 10a is greater than or equal to 0% and less than or equal to 20%, such that the non-display light transmissive area 10a keeps a small amount of the black matrix block 1025, increasing the ambient light reflectivity of the non-display light transmissive area 10a when the in-vehicle display device is in a screen-off state, further increasing a degree of reflectivity matching between the non-display light transmissive area 10a and the main display area 10b1 when the in-vehicle display device is in the screen-off state.

In the present embodiment, as shown in FIG. 4, the plurality of openings include a plurality of first openings 1026, a plurality of second openings 1027, and at least one third opening 1028. The plurality of first openings 1026 are disposed at the main display area 10b1, the plurality of second openings 1027 are disposed at the transition display area 10b2, and the at least one third opening 1028 is disposed at the non-display light transmissive area 10a, a size of the second openings 1027 is less than or equal to a size of the first openings 1026, in the direction from the main display area 10b1 to the non-display light transmissive area 10a, the size of at least a part of the second openings decreases, and a size of the third opening 1028 is greater than the size of the first openings.

In the present embodiment, as shown in FIG. 2, the color filter layer 1022 includes a first red color resist R1, a first blue color resist B1, a first green color resist G1, a second red color resist R2, and a second blue color resist B2. One first red color resist R1, one first blue color resist B1, and one first green color resist G1 sequentially arranged constitute one first repetitive element, and a plurality of the first repetitive element is repeatedly disposed at the fourth area 102b of the color filter substrate 102. The black matrix block 1025 is disposed between any two of one first red color resist R1, one first blue color resist B1, and one first green color resist G1. The second red color resist R2 and the second blue color resist B2 stacked together are disposed at the second area 102a of the color filter substrate 102. The second red color resist R2 is disposed close to the second substrate 1021 and located in the third opening 1028 and on the black matrix block 1025.

Figure 5:
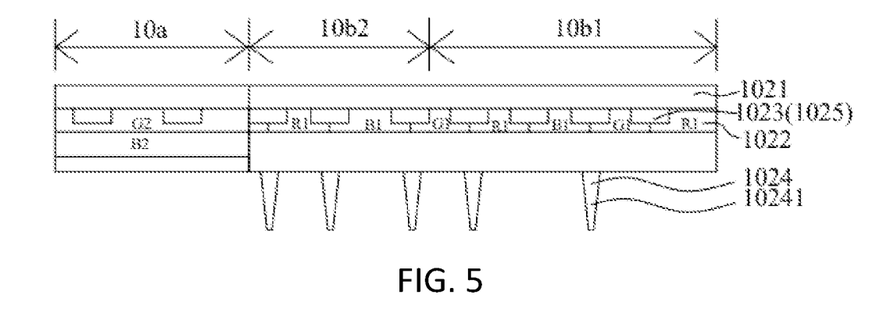
FIG. 5 is a schematic diagram of a color filter substrate of the in-vehicle display device according to another embodiment of the present application.

FIG. 5 is a schematic diagram of a color filter substrate of the in-vehicle display device according to another embodiment of the present application. The color filter substrate shown in FIG. 5 is basically the same as that shown in FIG. 2, difference is that the color filter layer 1022 includes a second green color resist G2 and the second blue color resist B2 stacked together that are disposed at the second area 102a of the color filter substrate 102, and the second green color resist G2 is disposed close to the second substrate 1021 and located in the third opening 1028 and on the black matrix block 1025.

Figure 6:
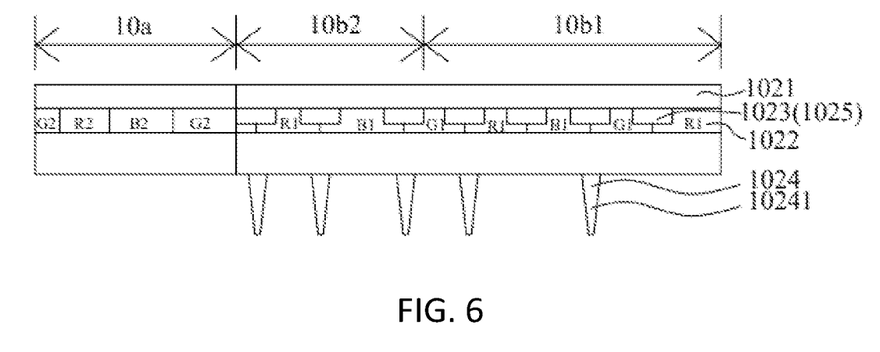
FIG. 6 is a schematic diagram of a color filter substrate of the in-vehicle display device according to still another embodiment of the present application.

FIG. 6 is a schematic diagram of a color filter substrate of the in-vehicle display device according to still another embodiment of the present application. The color filter substrate shown in FIG. 6 is basically the same as that shown in FIG. 2, difference is that an area occupation ratio of the black matrix block 1025 at the second area 102a of the color filter substrate 102 is 0%, and the color filter layer 1022 includes a second repetitive element disposed at the second area 102a of the color filter substrate 102. The second repetitive element consists of one second red color resist R2, one second blue color resist B2, and one second green color resist G2 sequentially arranged. Wherein, the second red color resist R2 is same as the first red color resist R1, the second blue color resist B2 is same as the first blue color resist B1, and the second green color resist G2 is same as the first green color resist G1. It can be understood that a size of the second red color resist R2 and a size of the first red color resist R1 can be different, a size of the second blue color resist B2 and a size of the first blue color resist B1 can be different, and a size of the second green color resist G2 and a size of the first green color resist G1 can be different.

Table 2 shows transmittance of infrared with a wavelength of 940±10 nm with respect to film layers of the color filter substrate.

TABLE 2

| film layers | transmittance |
|---|---|
| black matrix block | less than 10% |
| red color resist | greater than 90% |
| blue color resist | greater than 90% |
| green color resist | greater than 90% |

It can be seen from table 2 that transmittance of infrared with a wavelength of 940±10 nm with respect to the black matrix block is very low. Decreasing the black matrix block is advantageous to increasing infrared transmittance of the second area of the color filter substrate, and keeping the color filter layer has a smaller effect on infrared transmittance.

In the present embodiment, the supporting pillar 1024 includes a first supporting pillar 10241 and a second supporting pillar 10242. The first supporting pillar 10241 is disposed at the fourth sub-area 102b2 corresponding to the black matrix block 1025, and the second supporting pillar 10242 is disposed at the third sub-area 102b1 corresponding to the black matrix block 1025. Wherein, a height of the first supporting pillar 10241 is equal to a height of the second supporting pillar 10242, and a distribution density of the first supporting pillar 10241 is less than a distribution density of the second supporting pillar 10242, such that a cell gap of the display panel at the display area 10b and the non-display light transmissive area 10a is uniform. It can be understood that when the height of the first supporting pillar 10241 is equal to the height of the second supporting pillar 10242, the distribution density of the first supporting pillar 10241 can be equal to the distribution density of the second supporting pillar 10242. At this time, an area of a lower surface of the first supporting pillar 10241 close to the second substrate 1021 is less than an area of a lower surface of the second supporting pillar 10242 close to the second substrate 1021, such that the cell gap of the display panel at the display area 10b and the non-display light transmissive area 10a is uniform.

It should be explained that there is no or a small number of the supporting pillar disposed at the non-display light transmissive area 10a of the color filter substrate 102, preventing the supporting pillar from causing diffraction to infrared, thereby preventing transmission of the infrared with a preset wavelength from being affected.

Table 3 shows transmittance of infrared with a wavelength of 940±10 nm with respect to display panel 1 to display panel 4 according to the present application. Wherein, 3 L is the buffer layer, GI is the gate insulation layer, ILD is the layer insulation layer, BITO is the common electrode layer, TITO is the pixel electrode layer, PLN is the planarization layer, and a position relationship of the buffer layer, the gate insulation layer, the layer insulation layer, the common electrode layer, the planarization layer, and the pixel electrode layer is shown in FIG. 2. R is the red color resist, G is the green color resist, B is the blue color resist, PS is the supporting pillar, an area occupation ratio BM is an area occupation ratio of the black matrix block, and the red color resist, the blue color resist, the supporting pillar, and the black matrix block are shown in FIG. 2. "+" means keeping film layers, and "−" means removing film layers.

TABLE 3

| | | array substrate | | | | | | | color filter substrate | | | | | |
|---|---|---|---|---|---|---|---|---|---|---|---|---|---|---|
| | | | | | | | | | BM area occupation ratio | R | G | B | PS | transmittance |
| | | 3L | GI | ILD | BITO | TITO | PV | PLN | | | | | | |
| display panel 1 | main display area | + | + | + | + | + | + | + | 30% | + | + | + | + | ≤50% |
| | non-display light transmissive area | + | + | − | − | − | − | + | 0% | + | − | + | − | ≥80% |
| | transition display area | + | + | + | + | + | + | + | 30%-45% | + | + | + | + | ≤50% |
| display | main display area | + | + | + | + | + | + | + | 30% | + | + | + | + | ≤50% |

TABLE 3-continued

| | | array substrate | | | | | | color filter substrate | | | | | |
|---|---|---|---|---|---|---|---|---|---|---|---|---|---|
| | | | | | | | | BM area occupation | | | | | transmittance |
| | | 3L | GI | ILD | BITO | TITO | PV | PLN | ratio | R | G | B | PS | |
| panel 2 | non-display light transmissive area | + | + | − | − | − | − | + | 1% | + | − | + | − | 60%-70% |
| | transition display area | + | + | + | + | + | + | + | 30%-45% | + | + | + | + | ≤50% |
| display panel 3 | main display area | + | + | + | + | + | + | + | 30% | + | + | + | + | ≤50% |
| | non-display light transmissive area | + | + | − | + | − | − | + | 0% | + | − | + | − | 70%-75% |
| | transition display area | + | + | + | + | + | + | + | 30%-45% | + | + | + | + | ≤50% |
| display panel 4 | main display area | + | + | + | + | + | + | + | 30% | + | + | + | + | ≤50% |
| | non-display light transmissive area | + | + | + | − | − | − | + | 0% | + | − | + | − | 75%-80% |
| | transition display area | + | + | + | + | + | + | + | 30%-45% | + | + | + | + | ≤50% |

It can be seen from table 3 that transmittance of infrared with a wavelength of 940±10 nm at the non-display light transmissive area of the display panel according to the present embodiment can reach beyond 80%. At the non-display light transmissive area, the greater the area occupation ratio BM is, the lower transmittance of infrared with a wavelength of 940±10 nm with respect to the display panel is. At the non-display light transmissive area, removing film layers with lower transmittance of infrared with a wavelength of 940±10 nm is more advantageous to increasing transmittance of infrared with a wavelength of 940±10 nm.

In the present embodiment, an area of the non-display light transmissive area 10a of the display panel 10 is greater than or equal to an area of the light incidence surface 30a of the infrared sensing component 30, increasing transmittance of infrared emitted by the infrared sensing component 30 through the display panel 10.

Specifically, the area of the non-display light transmissive area 10a of the display panel 10 is greater than the area of the light incidence surface of the infrared sensing component 30, ensuring a higher transmittance of the infrared sensing component 30 through the display panel 10 within a certain assembly precision range. For example, when the non-display light transmissive area 10a of the display panel 10 and the light incidence surface of the infrared sensing component 30 are both round, a diameter of the non-display light transmissive area 10a of the display panel 10 is 5.8 millimeter, and a diameter of the light incidence surface of the infrared sensing component 30 is 5.3 millimeter.

In the present embodiment, the backlight module 20 is an edge type backlight module 20. The backlight module 20 is configured to provide the display area of the display panel with backlight. The backlight module 20 includes a bottom plate 201, a light guide plate 202, and an optical film 203. The light guide plate 202 is disposed on the bottom plate 201, and the optical film 203 is disposed on the light guide plate 202. The second through hole 20a penetrates the light guide plate 202 and the optical film 203, preventing infrared transmission from interference of the light guide plate 202 and the optical film 203 that affects imaging. Wherein, the optical film includes a diffusion film, a prism film, a brightness enhancement film, etc.

Furthermore, the backlight module 20 further includes an annular wall 204. The annular wall 204 is disposed on the bottom plate 201 corresponding to the non-display light transmissive area 10a. The annular wall 204 surrounds the light emergence surface 30a of the infrared sensing component 30, preventing infrared emitted by the infrared sensing component 30 from transmitting into the display area 10b. Meanwhile, an annular light-absorbing pad 205 is disposed between the annular wall 204 and the display panel 10, preventing the infrared from transmitting into the display area 10b through a gap between the display panel 10 and the backlight module 20.

It should be explained that the non-display light transmissive area 10a of the display panel 10 according to the present embodiment adopts a design of a blind hole, in combination with a design of a through hole that the backlight module 20 corresponds to the non-display light transmissive area 10a of the display panel 10, ensuring transmittance of infrared, further ensuring imaging quality of the infrared sensing component 30.

In the present embodiment, the area of the non-display light transmissive area 10a of the display panel 10 is less than a cross-sectional area of the second through hole 20a, such that under a certain installation tolerance, the infrared sensing component 30 can be accommodated in the second through hole 20a. For example, when the non-display light transmissive area 10a of the display panel 10 and a cross section of the second through hole 20a are both round, a diameter of the non-display light transmissive area 10a of the display panel 10 is 5.8 millimeter, and a diameter of the cross section of the second through hole 20a is 7.5 millimeters.

In the present embodiment, the in-vehicle display device 100 further includes an antiglare layer 50, and the antiglare layer 50 is configured to mitigate a moire effect during use of optical films of the backlight module 20. The antiglare layer 50 is disposed between the backlight module 20 and the display panel 10, and a third through hole 50a is defined in the antiglare layer 50 corresponding to the non-display light transmissive area 10a, preventing infrared transmission from interference of the antiglare layer 50.

Figure 7:
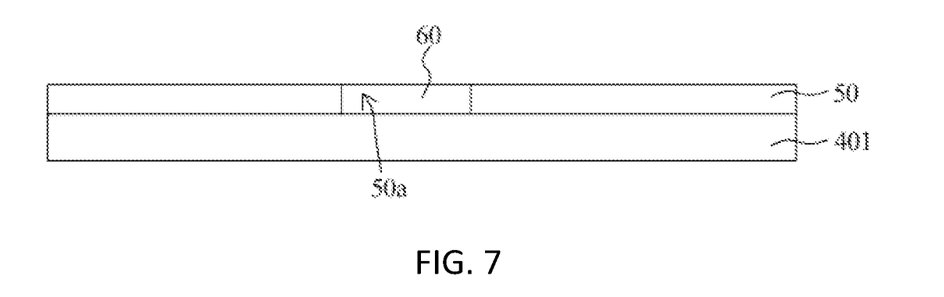
FIG. 7 is a schematic diagram of a first polarizing plate of the in-vehicle display device shown in FIG. 1.

Specifically, as shown in FIG. 7, the antiglare layer 50 is disposed on a surface of the first polarizing plate 401 close to the display panel 10, and a light transmissive protection layer 60 is disposed in the third through hole 50a to protect a part of the first polarizing plate 401 corresponding to the third through hole 50a, while ensuring transmittance of infrared. Wherein, the light transmissive protection layer 60 can be disposed only in the third through hole 50a, and it can also be disposed entirely on a surface of the antiglare layer 50 away from the first polarizing plate 401 and in the second through hole 20a. The antiglare layer 50 is a silicon dioxide granule layer coated on the first polarizing plate 401, and the light transmissive protection layer 60 is a hard coating layer such as a silicon nitride layer.

Figure 8:
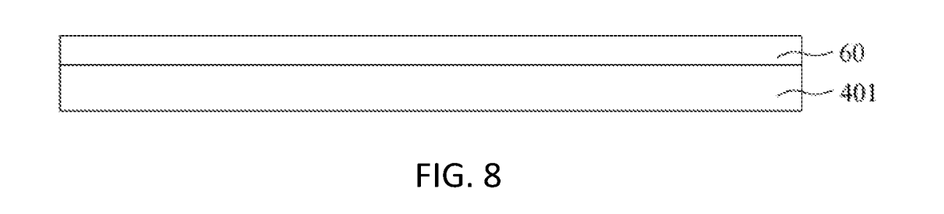
FIG. 8 is a schematic diagram of a first polarizing plate of the in-vehicle display device according to another embodiment of the present application.

As shown in FIG. 8, the light transmissive protection layer 60 can be disposed entirely on the surface of the first polarizing plate 401 close to the display panel 10 to protect the surface of the first polarizing plate 401 close to the display panel 10.

Although the present application has been explained in relation to its preferred embodiment, it does not intend to limit the present application. It will be apparent to those skilled in the art having regard to this present application that other modifications of the exemplary embodiments beyond these embodiments specifically described here may be made without departing from the spirit of the application. Accordingly, such modifications are considered within the scope of the application as limited solely by the appended claims.

What is claimed is:

1. An in-vehicle display device, comprising:
 a display panel comprising a non-display light transmissive area and a display area located on a periphery of the non-display light transmissive area; and
 an infrared sensing component located on a back side of a light emergence surface of the display panel, disposed corresponding to the non-display light transmissive area, and configured to receive infrared;
 wherein an infrared transmittance of the non-display light transmissive area of the display panel is greater than an infrared transmittance of the display area of the display panel;
 wherein the display area comprises a main display area and a transition display area, and the transition display area is located between the main display area and the non-display light transmissive area;
 wherein the infrared transmittance of the non-display light transmissive area of the display panel is greater than an infrared transmittance of the main display area of the display panel; and
 wherein an infrared transmittance of at least part of the transition display area of the display panel is less than the infrared transmittance of the main display area of the display panel, and the infrared transmittance of the at least part of the transition display area of the display panel decreases in a direction from the main display area to the transition display area.

2. The in-vehicle display device as claimed in claim 1, wherein the infrared transmittance of the non-display light transmissive area of the display panel is greater than or equal to 50%.

3. The in-vehicle display device as claimed in claim 2, wherein the infrared transmittance of the non-display light transmissive area of the display panel is greater than or equal to 70%.

4. The in-vehicle display device as claimed in claim 1, wherein the infrared transmittance of the main display area of the display panel is less than 50%.

5. The in-vehicle display device as claimed in claim 1, wherein the display panel comprises:
 a black matrix layer comprising a black matrix block;
 wherein an area occupation ratio at the main display area of the black matrix block disposed at the main display area is greater than an area occupation ratio at the non-display light transmissive area of the black matrix block disposed at the non-display light transmissive area, an area occupation ratio at the transition display area of the black matrix block disposed at the transition display area is greater than the area occupation ratio at the main display area of the black matrix block disposed at the main display area, and a unit area occupation ratio at the transition display area of the black matrix block disposed at the transition display area increases in a direction from the main display area to the non-display light transmissive area.

6. The in-vehicle display device as claimed in claim 5, wherein a ratio between the area occupation ratio at the main display area of the black matrix block disposed at the main display area and the area occupation ratio at the non-display light transmissive area of the black matrix block disposed at the non-display light transmissive area is greater than or equal to 1.5.

7. The in-vehicle display device as claimed in claim 5, wherein the area occupation ratio of the black matrix block at the main display area is greater than or equal to 30%, and the area occupation ratio of the black matrix block at the non-display light transmissive area is greater than or equal to 0% and less than or equal to 20%.

8. The in-vehicle display device as claimed in claim 5, wherein the black matrix layer comprises:
 a plurality of first openings disposed at the main display area;
 a plurality of second openings disposed at the transition display area, wherein a size of the second openings is less than or equal to a size of the first openings, and in the direction from the main display area to the non-display light transmissive area, the size of at least a part of the second openings decreases; and
 at least one third opening disposed at the non-display light transmissive area, wherein a size of the third opening is greater than the size of the first openings.

9. The in-vehicle display device as claimed in claim 1, wherein the display panel comprises a plurality of pixels, and a size of the transition display area in a direction from the main display area to the non-display light transmissive area is greater than or equal to a size corresponding to five of the pixels.

10. The in-vehicle display device as claimed in claim 9, wherein the size of the transition display area in the direction from the main display area to the non-display light transmissive area is less than or equal to a size corresponding to fifteen of the pixels.

11. The in-vehicle display device as claimed in claim 1, wherein the display panel comprises:
 an array substrate comprising a first area corresponding to the non-display light transmissive area; and
 a color filter substrate disposed facing the array substrate, wherein the color filter substrate comprises a second area corresponding to the non-display light transmissive area, and an overlapping area of the second area and the first area is the non-display light transmissive area;
 wherein an area of the first area is different from an area of the second area.

12. The in-vehicle display device as claimed in claim 11, wherein the color filter substrate is located on a light emergence side of the display panel, and the area of the second area is less than the area of the first area; or the array substrate is located on the light emergence side of the display panel, and the area of the first area is less than the area of the second area.

13. The in-vehicle display device as claimed in claim 11, wherein the array substrate comprises a third area located on a periphery of the first area corresponding to the display area, the array substrate comprises a pixel electrode layer, and the pixel electrode layer comprises:

a plurality of pixel electrodes with a slit disposed at the third area of the array substrate; and a first through hole disposed at the first area of the array substrate and penetrating the pixel electrode layer.

14. The in-vehicle display device as claimed in claim 11, wherein the array substrate comprises:
a substrate;
a layer insulation layer disposed on a surface of the substrate close to the color filter substrate;
a common electrode layer disposed on one side of the layer insulation layer close to the color filter substrate;
a passivation layer disposed on one side of the common electrode layer close to the color filter substrate; and
a blind hole defined at the first area and penetrating the layer insulation layer, the common electrode layer, and the passivation layer.

15. The in-vehicle display device as claimed in claim 1, comprising:
a backlight module located on the back side of the light emergence surface of the display panel, wherein a second through hole is defined in the backlight module corresponding to the non-display light transmissive area, the second through hole penetrates the backlight module, and the infrared sensing component is disposed in the second through hole.

16. The in-vehicle display device as claimed in claim 15, wherein an area of the non-display light transmissive area of the display panel is greater than or equal to an area of a light incidence surface of the infrared sensing component, and the area of the non-display light transmissive area of the display panel is less than a cross-sectional area of the second through.

17. The in-vehicle display device as claimed in claim 15, comprising:
an antiglare layer disposed between the backlight module and the display panel, wherein a third through hole is defined in the antiglare layer corresponding to the non-display light transmissive area, and a light transmissive protection layer is disposed in the third through hole; and a polarizing plate disposed between the backlight module and the display panel, wherein the antiglare layer is disposed on a surface of the polarizing plate close to the display panel.

18. The in-vehicle display device as claimed in claim 15, comprising:
a light transmissive protection layer; and
a polarizing plate disposed between the backlight module and the display panel, wherein the light transmissive protection layer is disposed on a surface of the polarizing plate close to the display panel.

19. The in-vehicle display device as claimed in claim 1, wherein the infrared sensing component comprises:
an infrared emitter configured to emit infrared, wherein a wavelength of the infrared ranges from 850 nanometers to 1000 nanometers; and
an infrared receiver configured to receive the infrared.

20. An in-vehicle display device, comprising:
a display panel comprising a non-display light transmissive area and a display area located on a periphery of the non-display light transmissive area; and
an infrared sensing component located on a back side of a light emergence surface of the display panel, disposed corresponding to the non-display light transmissive area, and configured to receive infrared,
wherein an infrared transmittance of the non-display light transmissive area of the display panel is greater than an infrared transmittance of the display area of the display panel;
wherein the display panel comprises:
an array substrate comprising a first area corresponding to the non-display light transmissive area; and
a color filter substrate disposed facing the array substrate, wherein the color filter substrate comprises a second area corresponding to the non-display light transmissive area; and
wherein an overlapping area of the second area and the first area is the non-display light transmissive area, and an area of the first area is different from an area of the second area.

* * * * *